United States Patent
Pede et al.

(10) Patent No.: US 12,234,155 B2
(45) Date of Patent: Feb. 25, 2025

(54) FUNCTIONALIZED ACTIVATED CARBON PRODUCTS, PROCESSES FOR PRODUCING FUNCTIONALIZED ACTIVATED CARBON PRODUCTS, AND USES OF FUNCTIONALIZED ACTIVATED CARBON PRODUCTS

(71) Applicant: CARBONIX INC., Fort William First Nation (CA)

(72) Inventors: Paul Raivo Pede, Peterborough (CA); Andrew James Vreugdenhil, Peterborough (CA); Oliver Kenneth Luke Strong, Peterborough (CA); Kevin Malcolm Scotland, Peterborough (CA); Sarah Julie Bégin, Peterborough (CA)

(73) Assignee: CARBONIX INC., Fort William First Nation (CA)

( * ) Notice: Subject to any disclaimer, the term of this patent is extended or adjusted under 35 U.S.C. 154(b) by 0 days.

(21) Appl. No.: 18/712,758

(22) PCT Filed: Dec. 12, 2022

(86) PCT No.: PCT/CA2022/051808
§ 371 (c)(1),
(2) Date: May 23, 2024

(87) PCT Pub. No.: WO2023/108264
PCT Pub. Date: Jun. 22, 2023

(65) Prior Publication Data
US 2024/0327224 A1    Oct. 3, 2024

Related U.S. Application Data

(60) Provisional application No. 63/289,706, filed on Dec. 15, 2021.

(51) Int. Cl.
*C01B 32/312*    (2017.01)
*C01B 32/372*    (2017.01)
*C08F 292/00*    (2006.01)

(52) U.S. Cl.
CPC .......... *C01B 32/312* (2017.08); *C01B 32/372* (2017.08); *C08F 292/00* (2013.01)

(58) Field of Classification Search
CPC ..... C01B 32/312; C01B 32/372; C01B 32/30; C01B 32/306; C01B 32/318;
(Continued)

(56) References Cited

U.S. PATENT DOCUMENTS 4,898,676 A    2/1990   Horowitz et al.
9,249,241 B2 *  2/2016   Dai .......................... C22B 59/00

FOREIGN PATENT DOCUMENTS

WO    2006086599 A1    8/2006

OTHER PUBLICATIONS

Diyuk, et al., Functionalization of surface of carbon materials with bromine vapors at mediate high temperature: a thermogravimetric study, J. Therm. Anal. Calom. 2015; 120: 1665-1678 (Year: 2015).*
(Continued)

*Primary Examiner* — Daniel C. McCracken
(74) *Attorney, Agent, or Firm* — ABM INTELLECTUAL PROPERTY INC.; Adrienne Bieber McNeil (57) ABSTRACT

A process for producing functionalized activated carbon product includes creating grafting sites on a surface of an activated carbon product, to yield a precursor activated carbon product; exposing the precursor activated carbon product to at least a first vinyl monomer; and initiating a polymerization reaction to graft at least the first vinyl monomer to the grafting sites and polymerize the first vinyl monomer to yield the functionalized activated carbon product. A functionalized activated carbon product includes an
(Continued)

activated carbon product having a surface and at least a first polymer grafted to the surface. A process for removing contaminants from water includes adding a functionalized activated carbon product to contaminated water, wherein the functionalized activated carbon product includes an activated carbon product having a surface and at least a first polymer grafted to the surface; and allowing the functionalized activated carbon product to adsorb contaminants from the contaminated water.

13 Claims, 10 Drawing Sheets

(58) Field of Classification Search
CPC ..... C01B 32/324; C01B 32/33; C01B 32/336; C01B 32/342; C01B 32/348; C01B 32/354; C01B 32/36; C01B 32/366; C01B 32/378; C01B 32/382; C01B 32/384; C01B 32/39; C08F 292/00
See application file for complete search history.

(56) References Cited

OTHER PUBLICATIONS

Liu, et al., Polymer-Grafted Modification of Activated Carbon by Surface-Initiated AGET ATRP, Macromol. Chem. Phys. 2012; 213: 868-877 (Year: 2012).*
Gong, Z. et al., "Self-flocculated powdered activated carbon with different oxidation methods and their influence on adsorption behavior". Journal of Hazardous Materials, Oct. 26, 2015 (Oct. 26, 2015), vol. vol. 304 (2016), pp. 222-232.
Gong, Zailin & Li, Shujin & Ma, Jun & Zhang, Xiangdong. (2015). Synthesis of Recyclable Powdered Activated Carbon with Temperature Responsive Polymer for Bisphenol A Removal. Separation and Purification Technology. 157. 10.1016/j.seppur.2015.11.040.
International Search Report and Written Opinion issued in PCT/CA2022/051808 on Mar. 27, 2023.
Liu, Y., Miao, X., Zhu, J., Zhang, Z., Cheng, Z. and Zhu, X. (2012), Polymer-Grafted Modification of Activated Carbon by Surface-Initiated AGET ATRP. Macromol. Chem. Phys., 213: 868-877. https://doi.org/10.1002/macp.201100668.
Peng Liu & Tingmei Wang, 2007. "Surface-Initiated Atom Transfer Radical Polymerization Of Hydroxyethyl Acrylate From Activated Carbon Powder With Homogenized Surface Groups," Surface Review and Letters (SRL), World Scientific Publishing Co. Pte. Ltd., vol. 14(02), pp. 269-275.
Pennetta De Oliveira et al., "Dewatering of Oil Sands Tailings with Novel Chitosan-Based Flocculants". Energy & Fuels, Dec. 3, 2018 (Dec. 3, 2018), vol. vol. 32, pp. 5271-5278.
Stein, A. et al. "Functionalization of Porous Carbon Materials with Designed Pore Architecture", Advanced Materials, Jan. 12, 2009 (Jan. 12, 2009), vol. 21(3), pp. 265-293.
Tsubokawa, N., "Functionalization of Carbon Black by Surface Grafting of Polymers", Progress in Polymer Science, Jan. 1, 1992 (Jan. 1, 1992), vol. 17(3), pp. 417-470.
Yan, J. et al. "Brush-Modified Materials: Control of Molecular Architecture, Assembly Behavior, Properties and Applications", Progress in Polymer Science, Jan. 13, 2019 (Jan. 13, 2019), vol. 100.

* cited by examiner

FUNCTIONALIZED ACTIVATED CARBON PRODUCTS, PROCESSES FOR PRODUCING FUNCTIONALIZED ACTIVATED CARBON PRODUCTS, AND USES OF FUNCTIONALIZED ACTIVATED CARBON PRODUCTS

CROSS REFERENCES TO RELATED APPLICATIONS

This application is a national stage entry of international patent application no. PCT/CA2022/051808 filed on Dec. 12, 2022, which claims priority to U.S. Provisional Patent Application No. 63/289,706 filed on Dec. 15, 2021, each of which is incorporated herein by reference in its entirety.

FIELD

This document relates to activated carbon. More specifically, this document relates to functionalized activated carbon products, processes for producing functionalized activated carbon products, and uses of functionalized activated carbon products.

BACKGROUND

U.S. Pat. No. 9,249,241 (Dai et al.) describes a functionalized mesoporous carbon composition comprising a mesoporous carbon scaffold having mesopores in which polyvinyl polymer grafts are covalently attached. The mesopores have a size of at least 2 nm and up to 50 nm. Also described is a method for producing the functionalized mesoporous composition, wherein a reaction medium comprising a precursor mesoporous carbon, vinyl monomer, initiator, and solvent is subjected to sonication of sufficient power to result in grafting and polymerization of the vinyl monomer into mesopores of the precursor mesoporous carbon. Also described are methods for using the functionalized mesoporous carbon, particularly in extracting metal ions from metal-containing solutions.

SUMMARY

The following summary is intended to introduce the reader to various aspects of the detailed description, but not to define or delimit any invention.

Processes for producing functionalized activated carbon products are disclosed. According to some aspects, a process for producing a functionalized activated carbon product includes a) creating grafting sites on a surface of an activated carbon product, to yield a precursor activated carbon product; b) exposing the precursor activated carbon product to at least a first vinyl monomer; and c) initiating a polymerization reaction to graft at least the first vinyl monomer to the grafting sites and polymerize at least the first vinyl monomer, to yield the functionalized activated carbon product, where the functionalized activated carbon product includes the activated carbon product grafted with a polymer of at least the first vinyl monomer.

In some examples the polymer is grafted to the activated carbon in a brush configuration.

In some examples, step a) includes i) creating reactive sites on the surface of the activated carbon product; and ii) attaching an organic molecule to the reactive sites to provide the grafting sites. Step i) may include functionalizing the surface of the activated carbon product with a halogen. Step i) may include functionalizing the surface of the activated carbon product with bromine. Step ii) may include attaching an enol to the reactive sites. Step ii) may include attaching cis-9-octadecen-1-ol to the reactive sites.

In some examples, step b. may include adding the precursor activated carbon product to a solution of at least the first vinyl monomer, to yield a polymerization ready mixture. Step c) may include exposing the polymerization ready mixture to ultraviolet light. Step c) may include heating the polymerization ready mixture.

In some examples, the first vinyl monomer is ethylene, propylene, vinyl chloride, vinyl acetate, styrene, vinyl alcohol, methyl methacrylate, acrylamide, or diallyldimethylammonium chloride.

In some examples, step b) includes exposing the precursor activated carbon product to the first vinyl monomer and at least a second vinyl monomer, and step c) includes initiating the polymerization reaction to graft the first vinyl monomer to the grafting site and co-polymerize the first vinyl monomer and the second vinyl monomer, so that the polymer includes a co-polymer of the first vinyl monomer and the second vinyl monomer. In some examples, the co-polymer is a block co-polymer.

In some examples, step b) includes exposing the precursor activated carbon product to the first vinyl monomer and at least a second vinyl monomer; and step c) includes initiating the polymerization reaction to graft the first vinyl monomer to a first subset of the grafting sites and polymerize the first vinyl monomer and to graft the second vinyl monomer to a second subset of the grafting sites and polymerize the second vinyl monomer.

In some examples, the second vinyl monomer is ethylene, propylene, vinyl chloride, vinyl acetate, styrene, vinyl alcohol, methyl methacrylate, acrylamide, or diallyldimethylammonium chloride.

According to some aspects, a method for producing a functionalized activated carbon product includes a) creating grafting sites on a surface of an activated carbon product to yield a precursor activated carbon product, by functionalizing the surface of the activated carbon product with bromine to create reactive sites and then attaching an enol to the reactive sites to provide the grafting sites; b) exposing the precursor activated carbon product to at least a first vinyl monomer; and c) initiating a polymerization reaction to graft at least the first vinyl monomer to the grafting sites and polymerize the first vinyl monomer, to yield the functionalized activated carbon product, where the functionalized activated carbon product includes the activated carbon product grafted with a polymer of at least the first monomer.

Functionalized activated carbon products are also disclosed. According to some aspects, a functionalized activated carbon product includes an activated carbon product having a surface, and at least a first polymer grafted to the surface in a brush configuration.

In some examples, the first polymer is a polymer of at least a first vinyl monomer.

In some examples, the functionalized activated carbon product further includes a second polymer grafted to the surface.

In some examples, the first polymer is a co-polymer of a first vinyl monomer and a second vinyl monomer. In some examples, the co-polymer is a block co-polymer.

In some examples, the first polymer is polyacrylamide. In some examples, the first polymer is polydiallyldimethylammonium chloride.

In some examples, the first polymer has an average molecular weight of between about 40 and about 2000 (e.g.

an average molecular weight of about 100 kDa or of about 120 kDa or of about 250 kDa or of about 500 kDa or of about 1000 kDa)

In some examples, the functionalized activated carbon product is used in water cleaning.

In some examples, the functionalized activated carbon product is used in the removal of chloride ions from water.

Processes for removing contaminants from water are also disclosed. According to some aspects, a process for removing contaminants from water includes a) adding a functionalized activated carbon product to contaminated water, wherein the functionalized activated carbon product includes an activated carbon product having a surface and at least a first polymer grafted to the surface; and b) allowing the functionalized activated carbon product to adsorb contaminants from the contaminated water.

In some examples, the first polymer is grafted to the surface in a brush configuration.

In some examples, step b) includes allowing the activated carbon of the functionalized activated carbon product to adsorb contaminants from the contaminated water and/or allowing the first polymer to adsorb contaminants from the contaminated water.

In some examples, step b) further includes allowing the first polymer to flocculate contaminants in the contaminated water.

In some examples, step b) further includes allowing the first polymer to facilitate settling of contaminants in the contaminated water.

Systems for recovering contaminants from water are disclosed. According to some aspects, a system for recovering contaminants from water includes a pipeline to carry a supply of contaminated water, and a supply of a functionalized activated carbon product, to be in communication with an upstream site in the pipeline, under conditions to enable the removal of the contaminants from the water.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Furthermore, the present disclosure provides basis for and encompasses support for any one element, feature, structure, function, of any aspect and/or example embodiment described in the present disclosure including the figures, clauses and/or claims herein, which is itself claimed on its own or combined with any one or more elements, features, structures, functions, and/or steps from the same or any other aspects and/or examples described in the present disclosure including the figures, clauses and/or claims herein. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

As used herein, the term "about" indicates that a referenced value may vary, for example by plus or minus 5%. For example, a reference to a molecular weight of "about 100 kDa" may indicate that the molecular weight may be between 95 kDa and 105 kDa.

In this document, unless specified otherwise, all ranges are inclusive of the bounds of the range. For example, the statement that a temperature may be "between 750 degrees Celsius and 900 degrees Celsius" indicates that the temperature may be 750 degrees Celsius, or 900 degrees Celsius, or any number therebetween.

In any instance in which the disclosure refers to a single instance of an element, examples may include a multiple of such elements. The term "at least one" in reference to any element is not intended to force an interpretation on any other reference elsewhere in the disclosure to a single instance of an element to mean only one such instance of the element.

Generally disclosed herein are functionalized activated carbon products, processes for producing functionalized activated carbon products, and related uses. The functionalized activated carbon products may generally include an activated carbon product that is grafted with at least one polymer (e.g. polyacrylamide and/or polydiallyldimethylammonium chloride) in a brush configuration.

As used herein, the term "brush configuration" indicates that the polymer chains are tethered (e.g. through covalent bonding or physical adsorption) by one chain end to a solid surface. The polymer chains are not collapsed against the surface, but rather extend away from the surface (for example, stand generally upright with respect to the surface). This is in contrast to a "pancake configuration" in which polymers are collapsed against the surface.

The functionalized activated carbon products may generally be produced in a "grafting from" strategy, by creating a grafting site on a surface of an activated carbon product, and then initiating a polymerization reaction to graft a monomer to the grafting site and polymerize the monomer. The grafting site may be on an external surface of the activated carbon product, or may be on an internal surface (i.e. on a surface that is within a pore).

The functionalized activated carbon products may have a variety of uses, but may be particularly useful in water cleaning (e.g. decontamination or purification of water).

Without being limited by theory, it is believed that by having the polymer(s) in a brush configuration, both the polymer(s) and the activated carbon may remain accessible to contaminants in water, and thus the functionalized activated carbon product may clean water via two simultaneous mechanisms—i.e. by interaction of contaminants with the pores of the activated carbon (i.e. adsorption of contaminants into the pores), and by interaction of the contaminants with the polymer (i.e. adsorption of contaminants by the polymer and/or flocculation of contaminants with the polymer). Furthermore, it is believed that grafting the polymer(s) to the activated carbon product may yield a synergistic effect, whereby the interaction of the polymer(s) with the contaminants in the water draws the water towards the activated carbon, for further cleaning by the activated carbon.

Figure 1:
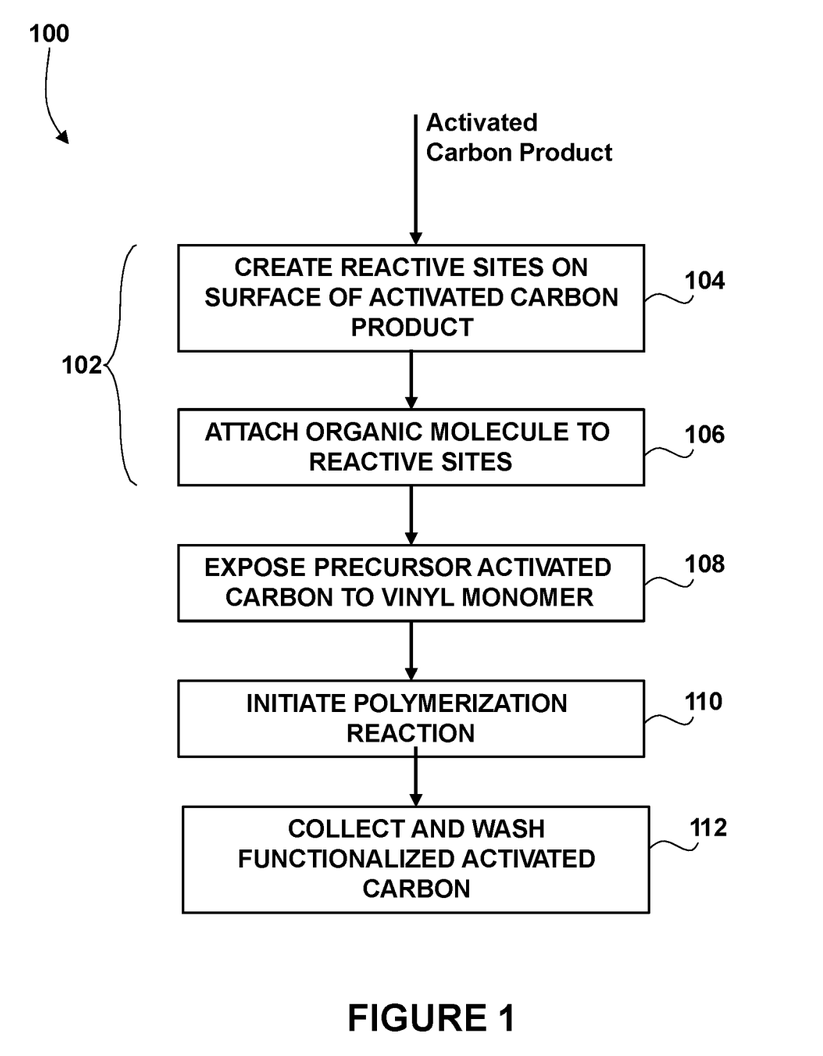
FIG. 1 is a flowchart of an example process for producing a functionalized activated carbon product.

Referring now to FIG. 1, an example process for producing a functionalized activated carbon product is shown. The feed to the process includes an activated carbon product. The activated carbon product may be, but is not limited to, powdered activated carbon, granular activated carbon, activated carbon film, extruded activated carbon, bead activated carbon, impregnated active carbon, and combinations thereof. The activated carbon product may be, for example, mesoporous, and/or microporous. The activated carbon product may be produced by any suitable fabrication technique, such as the one disclosed in International Patent Application Publication No. PCT/CA2022/051148 filed on Jul. 26, 2022, the entire contents of which are incorporated herein by reference in their entirety.

At step 102, grafting sites are created on the surface of the activated carbon product (e.g. on an external surface or an internal surface), to yield a precursor activated carbon product. This may be achieved by first creating reactive sites on the surface of the activated carbon product (step 104), and then attaching an organic molecule to the reactive sites to provide the grafting sites (step 106).

Step 104 may include functionalizing the surface of the activated carbon product with a halogen (e.g. bromine or an acyl chloride group) or with oxygen containing moieties (e.g. OH or COOH), to yield the reactive sites. Preferably, the surface is functionalized with bromine by treating the activated carbon with dibromine ($Br_2$), hydrogen bromide (HBr), and/or a mixture of sodium bromate ($NaBrO_3$) and sodium bromide (NaBr), to yield brominated activated carbon of the following structure (where the structure of the activated carbon itself is simplified):

Step 106 may include attaching an organic molecule that contains a nucleophilic end group (e.g. —OH and/or —$NH_2$) and a long hydrocarbon chain with a site for polymerization (i.e. a site that may react with the radical formed by an initiator), such as a C=C bond. In some examples, the organic molecule is an enol, such as cis-9-octadecen-1-ol, 10-undecen-1-ol, 9-decen-1-ol, phytol (3,7,11,15-tetramethyl-2-hexadecen-1-ol), isophytol (3,7,11,15-tetramethyl-1-hexadecen-3-ol), or farnesol (3,7,11-trimethyl-2,6,10,dodecatrien-1-ol). Alternatively, other enols of other chain lengths and alkene positions may be used. Preferably, the organic molecule is attached by treating the brominated active carbon with the organic molecule in the presence of a base (e.g. NaOH), ammonia, or an organic amine (e.g. $R^1R^2NH$). In the case of cis-9-octadecen-1-ol, step 106 may yield a precursor activated carbon product of the following structure (where the structure of the activated carbon itself is simplified):

At step 108, the precursor activated carbon is exposed to at least a first vinyl monomer. For example, the precursor activated carbon may be added to a solution of the first vinyl monomer (e.g. in water), to yield a polymerization ready mixture.

The first vinyl monomer may be, for example ethylene, propylene, vinyl chloride, vinyl acetate, styrene, vinyl alcohol, methyl methacrylate, acrylamide, or diallyldimethylammonium chloride.

The first vinyl monomer may be selected to tailor the properties of the end-product functionalized activated carbon product. For example, in some instances, the vinyl monomer may be selected to yield a functionalized activated carbon product that includes a positively charged polymer, in order to facilitate use of the functionalized activated carbon product in the adsorption of negatively charged contaminants from water. Alternatively, in some instances, the vinyl monomer may be selected to yield a functionalized activated carbon that includes a negatively charged polymer, in order to facilitate use of the functionalized activated carbon product in the adsorption of positively charged contaminants from water.

In some examples, only a single vinyl monomer is used. In other examples, a mixture of vinyl monomers may be used (i.e. the precursor activated carbon product may be exposed to a first vinyl monomer, a second vinyl monomer, and so on, where the exposure may be simultaneous or stepwise). In such examples, the process may be tailored to yield a functionalized activated carbon that includes a co-polymer (i.e. a polymer of the first vinyl monomer and the second vinyl monomer, optionally a block co-polymer), or to yield a functionalized activated carbon that includes a first polymer and a second polymer. The second vinyl monomer may be, for example ethylene, propylene, vinyl chloride, vinyl acetate, styrene, vinyl alcohol, methyl methacrylate, acrylamide, or diallyldimethylammonium chloride.

At step 110, a polymerization reaction is initiated, to graft the first vinyl monomer to the grafting sites and polymerize the first vinyl monomer. This yields the functionalized activated carbon product—i.e. the activated carbon product, grafted with a polymer of at least the first vinyl monomer. The polymer may be grafted in a brush configuration.

The polymerization reaction may be initiated, for example, by photolysis (i.e. exposing the polymerization ready mixture to ultraviolet light), thermolysis (i.e. heating the polymerization ready mixture, for example to a temperature of about 60 degrees Celsius for about 3 hours), or redox.

As noted above, grafting of the first vinyl monomer to the grafting sites and polymerization of the first vinyl monomer may refer to grafting of only the first vinyl monomer to the grafting sites and polymerization of only the first vinyl monomer, or grafting of the first vinyl monomer to the grafting sites and co-polymerizing the first vinyl monomer with a second (or subsequent) vinyl monomer to yield a co-polymer. Furthermore, step 110 may optionally include grafting the first vinyl monomer to a first subset of the grafting sites and polymerizing the first vinyl monomer, and grafting the second vinyl monomer to a second subset of the grafting sites and polymerizing the second vinyl monomer (to yield a functionalized activated carbon product that includes a first polymer and a second polymer).

An example activated carbon product grafted with polyacrylamide in a brush configuration is shown below (where the structure of the activated carbon itself is simplified):

The polymer chain length may be tailored by varying the concentration of the vinyl monomer and the initiator.

The resulting polymer may have an average molecular weight of, for example, between about 40 kDa and about 2000 kDa, e.g. about 100 kDa or 120 kDa or 1000 kDa. More specifically, in the case of polyacrylamide, the molecular weight may in some examples be between about 250 kDa and 2000 kDa. In the case of polydiallyldimethylammonium chloride, the molecular weight may in some examples be between about 40 kDa and 200 kDa.

Upon completion of the polymerization reaction, the functionalized activated carbon product may be collected and washed (step 112).

Figure 2:
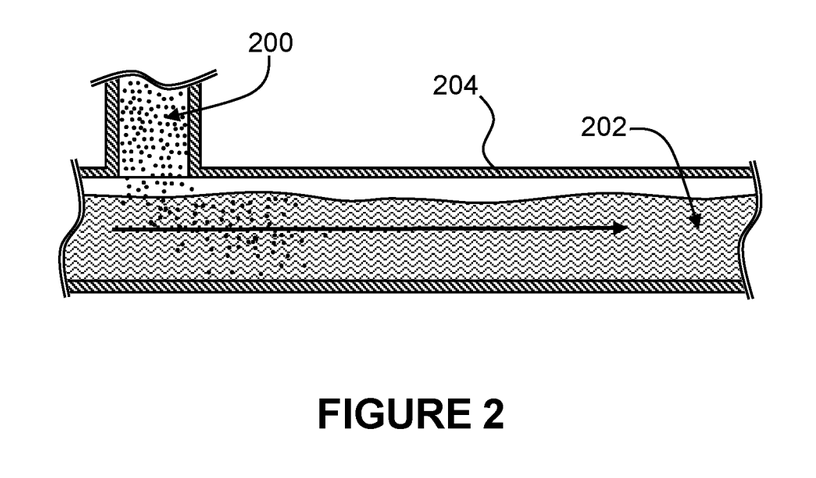
FIG. 2 is a schematic diagram showing the addition of the functionalized activated carbon product of FIG. 1 to a moving body of water in a pipeline.

In use, the functionalized activated carbon product may be added to contaminated water (e.g. oil-sands process affected-water), in order to remove contaminants (e.g. chloride ions) from the water. The functionalized activated carbon product may be added directly to a stagnant body of water (e.g. a tailings pond, such as a mature fine tailings pond), or to a moving body of water (e.g. to a pipeline between tailings ponds). FIG. 2 shows an example in which the functionalized activated carbon product 200 is added to a moving body of water 202 in a pipeline 204. The functionalized activated carbon product may then be allowed to adsorb contaminants from the contaminated water. This may include allowing the activated carbon of the functionalized activated carbon product to adsorb contaminants from the contaminated water, and/or allowing the polymer to adsorb contaminants from the contaminated water. Furthermore, the polymer may flocculate contaminants in the contaminated water, and/or may facilitate settling of contaminants in the contaminated water.

Optionally, the functionalized activated carbon product may be pre-treated in preparation for use. For example, where a functionalized activated carbon product is to be used to absorb chloride ions from water, the functionalized activated carbon product may be pre-treated with sodium hydroxide, in order to strip any pre-existing chloride ions from the functionalized activated carbon product.

EXAMPLES

Example 1: Preparation of AC-PAM and AC-pDADMAC

Preparation of activated carbon product: An activated carbon product was prepared as described in International Patent Application Publication No. PCT/CA2022/051148 filed on Jul. 26, 2022. Briefly, petroleum coke was ground to a size of less than 0.308 mm and pretreated by heating the petroleum coke at 400 degrees Celsius under air for 1 hour to remove any volatile compounds. Five grams of dried petroleum coke was then mixed with dry potassium hydroxide (KOH) at mass ratios of 1:1. The mixture was placed in stainless steel crucibles and heated to 400 degrees Celsius under nitrogen and held at that temperature for 30 minutes to melt the KOH. The samples were then activated by heating under nitrogen to temperature of 900 degrees Celsius under nitrogen. The samples were held at this temperature for 15 minutes. Samples were then washed with 20 ml of water per gram of unwashed activated product, to yield the activated carbon product.

Figure 3:
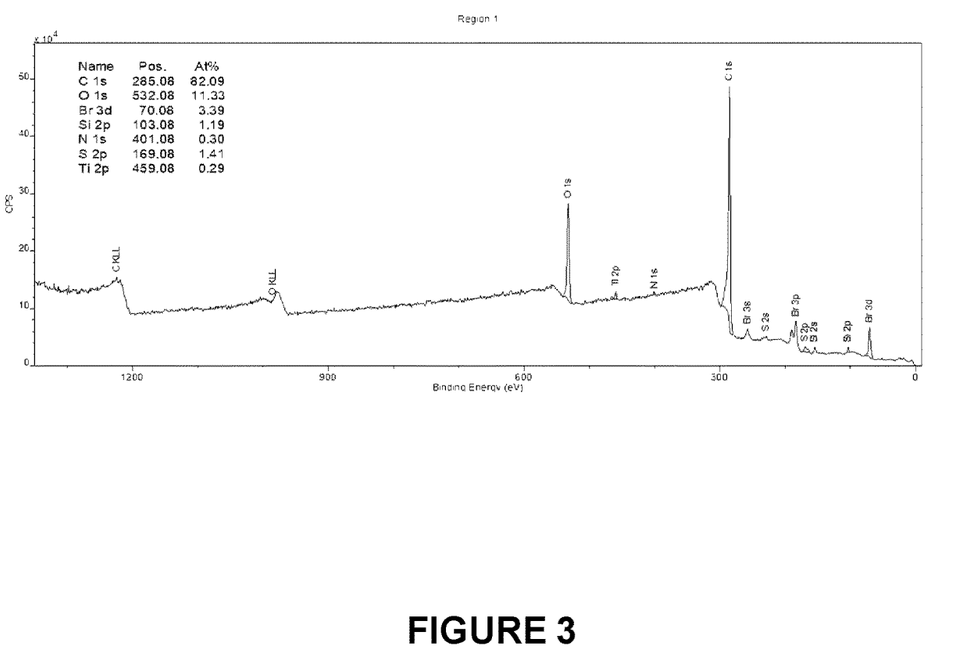
FIG. 3 shows X-ray photoelectron spectroscopy results of brominated activated carbon.
Figure 4:
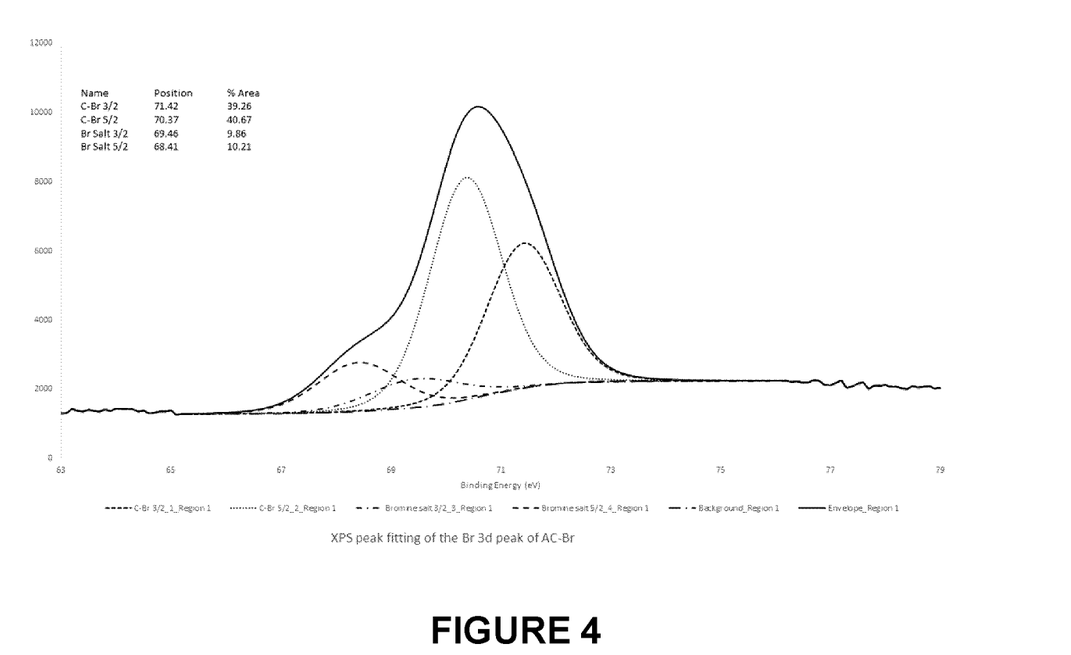
FIG. 4 shows peak fitting of the carbon C1s peak of FIG. 3.

Functionalization of the surface of activated carbon product with bromine to yield brominated activated carbon (AC-Br): $Br_2$ (15 mL) was added to chilled tetrahydrofuran (THF) (120 mL) and the solution was stirred for 15 minutes. The activated carbon product (15 g) was added to the solution while on ice. The solution was then allowed to return to room temperature and stirred for 3 hours at room temperature. The solution was then filtered and washed with THF until the filtrate ran clear. X-ray photoelectron spectroscopy (XPS) (FIG. 3) shows the presence of 3% bromine on the activated carbon product. The peak fitting (FIG. 4) of the carbon C1s peak shows that the majority of the bromine (~80%) is the carbon bromine bonds.

Figure 5:
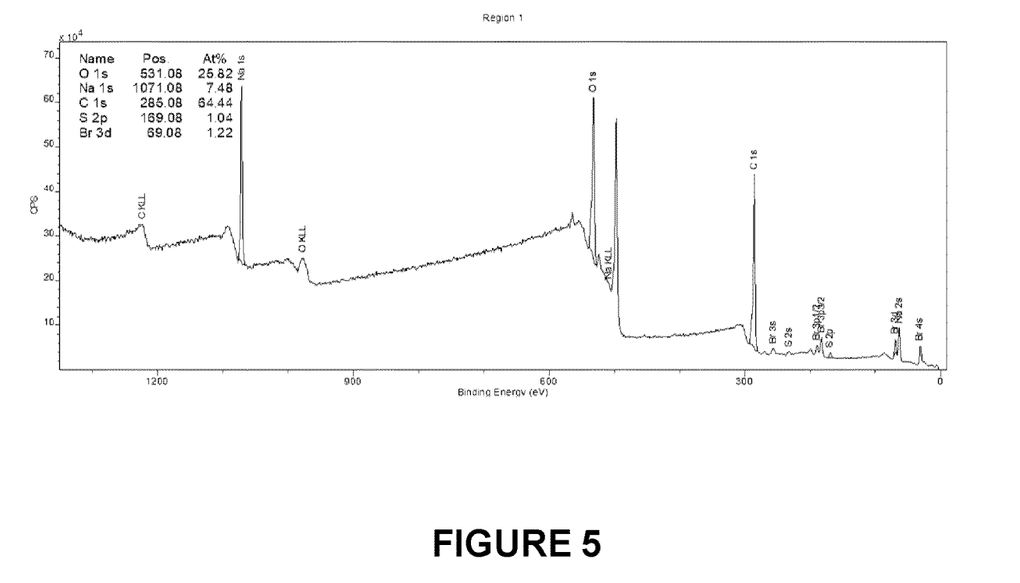
FIG. 5 shows X-ray photoelectron spectroscopy results of AC-Enol.
Figure 6:
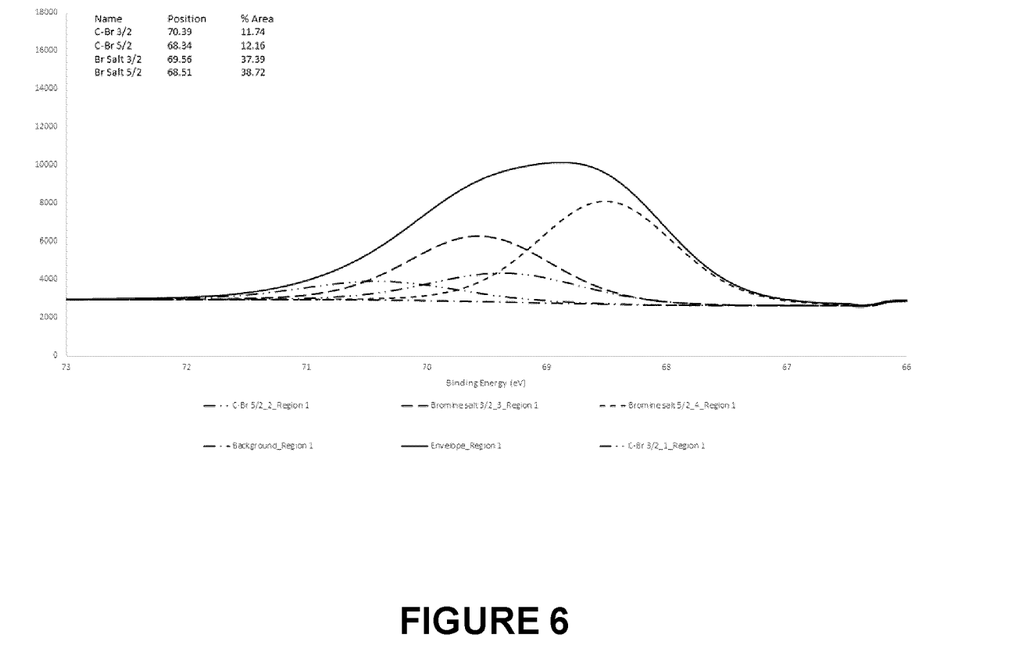
FIG. 6 shows peak fitting of the C1s peak of the material of FIG. 5.

Attaching enol to the reactive sites to yield enol decorated activated carbon (AC-Enol): cis-9-octadecen-1-ol (1.42 ml (0.0045 mols)) was dissolved in dimethylsulfoxide (DMSO) (15 ml), then sodium hydroxide (NaOH) (0.2 g (0.0045 mols)) was added to the solution and the mixture was stirred at 90 degrees Celsius until the NaOH dissolved. AC-Br (3 g) was added to this solution and the solution was refluxed for 3 hours. The solution was cooled, filtered and washed with DMSO (60 mL) and dried in an oven at 110 degrees Celsius for 18 hours. XPS of the AC-Enol (FIG. 5) shows an increase in the oxygen content of the compound. Peak fitting (FIG. 6) of the C1s peak of the enol shows that the predominate speciation of bromine (≈70%) is the salt. This salt results from the substitution of the bromine that is attached to the carbon (C—Br) with the oxygen of the enol.

Figure 7:
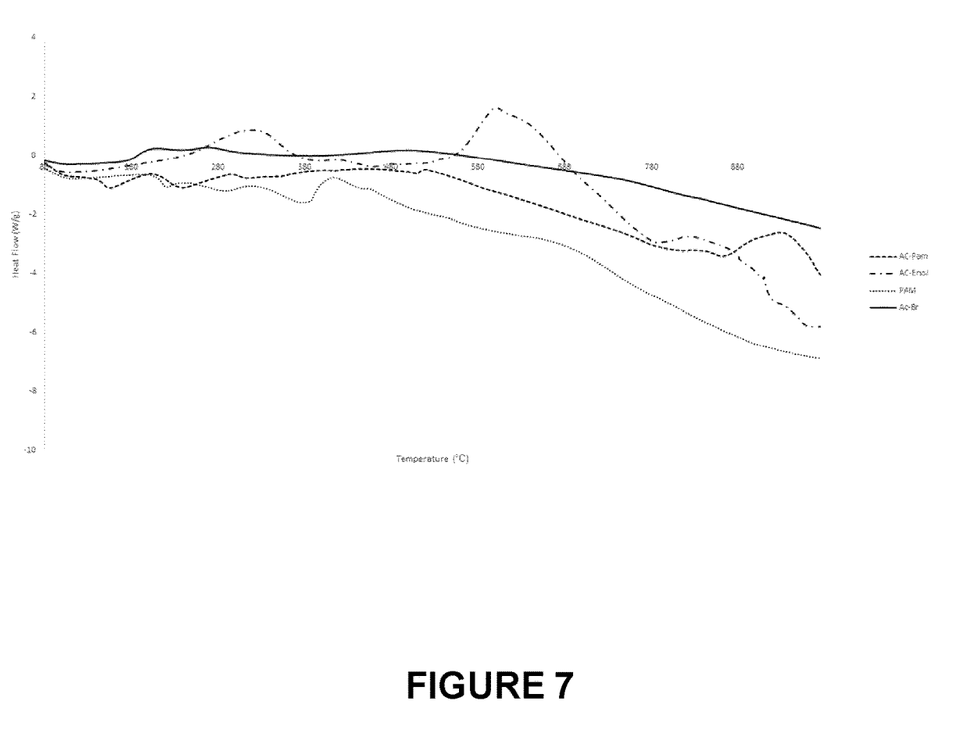
FIG. 7 shows differential scanning calorimetry of AC-PAM.

Grafting with acrylamide to yield activated carbon grafted with polyacrylamide (AC-PAM): acrylamide (1 g, 0.014 mols), 4-[(4,6-dimethylpyrimidin-2-yl)thio]-2,3,5,6-tetrafluorobenzenesulfonamide (V50) (0.120 g, $4.42 \times 10^{-4}$ mols), and urea (0.02 g, $3.33 \times 10^{-4}$ mols) were dissolved in Millipore water (15 mL). The solution was purged of oxygen 30 minutes using $N_2$. Then, the AC-Enol (3 g) was added to the solution, and the mixture was exposed to UV light for 3 hours. The differential scanning calorimetry of the AC-PAM shows a distinct peak at ≈900° C. which is not present in PAM, AC-Enol, or AC-Br, (FIG. 7). This suggest that this is a unique material.

Grafting with diallyldimethylammonium chloride to yield activated carbon grafted with polydiallyldimethylammonium chloride (AC-pDADMAC): diallyldimethylammonium chloride solution (3.5 g, 65 wt % in $H_2O$, 0.014 mols) and V50 (0.120 g, $4.42 \times 10^{-4}$ mols) was dissolved in Millipore water and diluted to 15 mL. The solution was purged of oxygen for 30 minutes using nitrogen. Then, AC-Enol (3 g) was added to the solution and heated to 60 degrees Celsius for 3 hours while stirring. The product was precipitated with the addition of acetone and collected by vacuum filtration. The AC-pDADMAC product was then washed with Millipore water and dried in the vacuum oven at 110 degrees Celsius.

Example 2: Use of AC-pDADMAC for Removal of Chlorine from Water

Synthesis of AC-pDADMAC: AC-Br and AC-enol were prepared as described above in Example 1. A solution of DADMAC (13.47 g, 0.05 mol, 60 wt % in $H_2O$) was weighed and diluted to a total volume of 50 mL. The solution was purged with $N_2$ for 30 minutes. The solution was heated to 60° C. in an oil bath, then 10 g of AC-enol and 0.27 g (0.001 mol) of V50 initiator was added to the solution while stirring under $N_2$. The flask was then closed and the reaction was allowed to proceed for 24 hours with stirring. The solution was then poured into excess acetone to precipitate the polymer, which was then isolated by vacuum filtration and washed with water to remove any excess free polymer, and dried at 110° C. overnight.

Preparation of Chlorine Exchange Resin: In order to strip existing chloride ions from the AC-pDADMAC, the AC-pDADMAC (0.6 g) (the resin) was added to 40 ml of 1M NaOH and the solution was stirred for 24 hours. The solution was then filtered, and the resin was stirred in 50 ml of water for 6 hours, filtered and dried in the oven at 110° C. for 18 hours.

Removal of Chlorine from Water: The resin was weighed and added to an aqueous solution of 600 ppm chloride ions in a ratio of 8 mL of solution for every 0.1 g of resin. The mixture was placed on a shaker table at 200 rpms for 24 hours. The solution was filtered, and the filtrate was isolated and filtered through a 0.45 UM filter. The filtrate then underwent a 100-fold dilution and was analyzed on an Ion Chromatograph.

Analysis of Chlorine: The quantification of chlorine in the solution was performed on a Metrohm 761 compact IC with a Metrosep A supp 5-150 column (4×150 mm, 5 μM particle size) with a polyvinylalcohol containing quaternary ammonium groups as the stationary phase. The mobile phase ($Na_2CO_3$: 3.2 mM and $NaHCO_3$: 1.0 mM) was degassed and filtered. The injection volume was 20 μL and the flow rate of the mobile phase was set to 0.8 mL min-1 with a total run time of 7.5 minutes.

Recycling: Resin that was previously used in an absorption experiment was reactivated as described above under the heading 'Preparation of Chlorine Exchange Resin': 0.6 g of the resin was added to 40 ml of 1M NaOH and the solution was stirred for 24 hours. The solution was then filtered, and the resin was stirred in 50 ml of water for 6 hours, filtered and dried in the oven at 110° C. for 18 hours.

Figure 8:
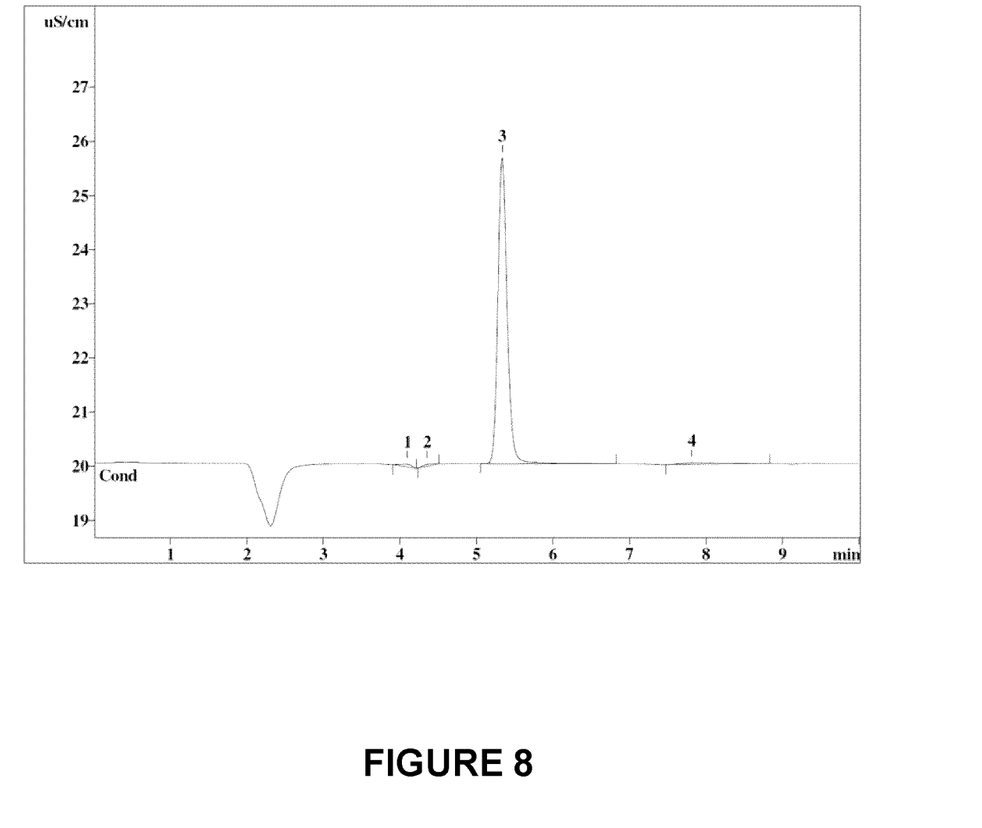
FIG. 8 is an IC trace of an aqueous chloride solution (diluted 100 fold) prior to exposure to AC-pDADMAC.
Figure 9:
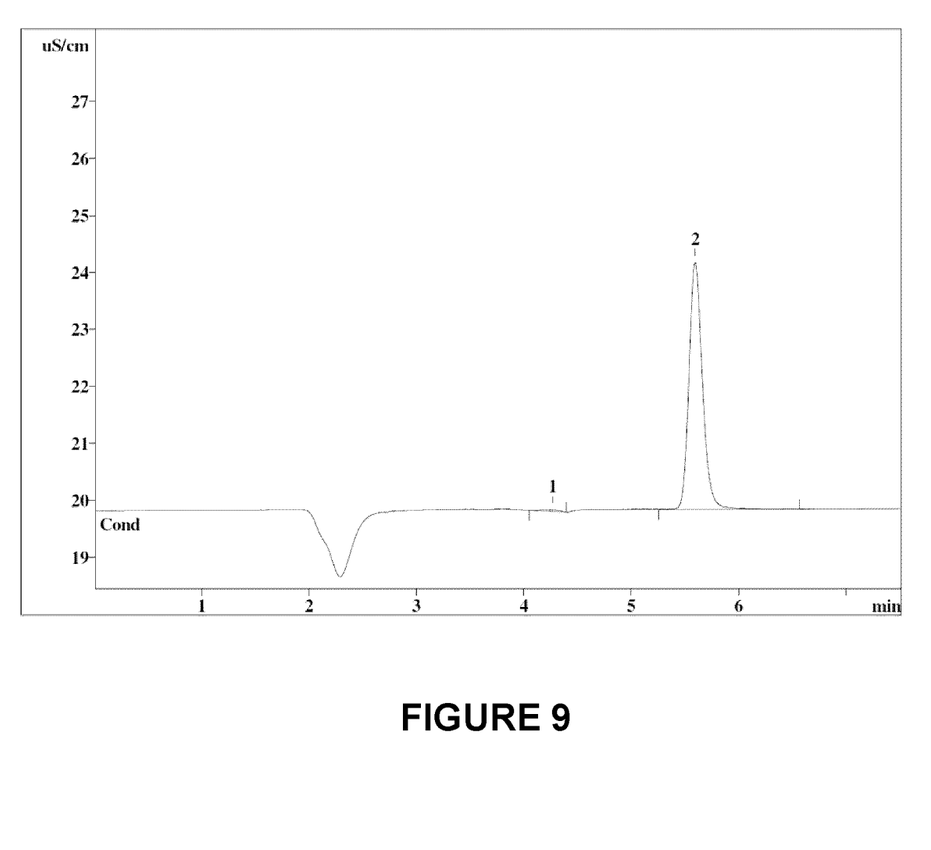
FIG. 9 is an IC trace of the aqueous chloride solution (diluted 100 fold) of FIG. 8, following 24 hours of exposure to AC-pDADMAC.

Results: FIG. 8 shows the IC trace of the aqueous chloride solution (diluted 100 fold) prior to exposure to the AC-PDADMAC chloride adsorption material. FIG. 9 shows the IC trace after the solution had been contacted by the resin and stirred for 24 hours. The chloride ion adsorption by the resin is demonstrated by a decrease in the area under the peak at 5.34 minutes, which is the elution time for chloride ions on this column. The concentration of chloride was obtained by comparing the area under the peak at 5.34 minutes to a calibration curve, which ranged in concentration from 0.2 ppm to 8 ppm.

Figure 10:
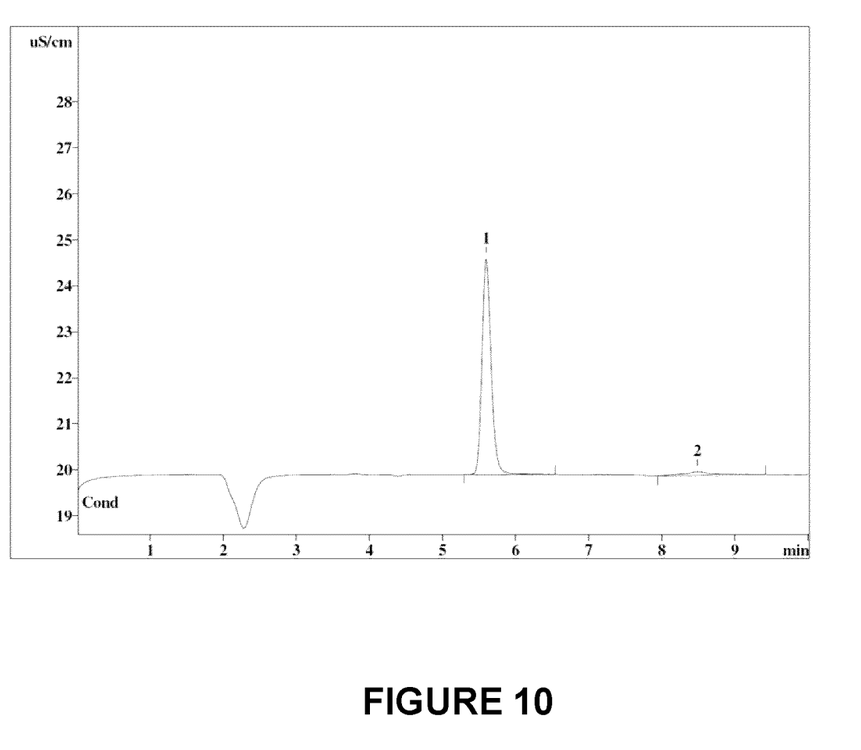
FIG. 10 is an IC trace of the aqueous chloride solution (diluted 100 fold) of FIGS. 8 and 9 following exposure AC-pDADMAC chloride which had been recycled once.

The resin shows a slight reduction in activity when recycled. The IC trace (FIG. 10) shows a 13% decrease in the chlorine content of the solution (Table 1). This was demonstrated by a decrease in the area under the peak at 5.34 minutes, which is the elution time for chlorine on this column. The concentration of chlorine was obtained by comparing the area under the peak at 5.34 minutes to a calibration curve.

Table 1 shows the area under the peak at 5.34 min and corresponding concentrations as obtained from the calibration curve.

TABLE 1

| Type of resin | Area under the peak (μS/cm*sec) | Concentration (ppm) (100-fold dilution) | Concentration of starting solution (ppm) | % Decrease |
|---|---|---|---|---|
| Normal resin | 37.940 | 4.8 | 480 | 20 |
| Recycled resin | 40.965 | 5.2 | 520 | 13 |

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

CLAUSES

Non-limiting examples are described in the following clauses:

1. A process for producing a functionalized activated carbon product, comprising: a. creating grafting sites on a surface of an activated carbon product, to yield a precursor activated carbon product; b. exposing the precursor activated carbon product to at least a first vinyl monomer; and c. initiating a polymerization reaction to graft at least the first vinyl monomer to the grafting sites and to polymerize at least the first vinyl monomer, to yield the functionalized activated carbon product, wherein the functionalized activated carbon product comprises the activated carbon product grafted with a polymer of at least the first vinyl monomer.

2. The process of any of the preceding or following clauses, wherein the polymer is grafted to the activated carbon product in a brush configuration.
3. The process of any of the preceding or following clauses, wherein step a. comprises: i. creating reactive sites on the surface of the activated carbon product; and iii. attaching an organic molecule to the reactive sites to provide the grafting sites.
4. The process of any of the preceding or following clauses, wherein step i. comprises functionalizing the surface of the activated carbon product with a halogen.
5. The process of any of the preceding or following clauses, wherein step i. comprises functionalizing the surface of the activated carbon product with bromine.
6. The process of any of the preceding or following clauses, wherein step ii. comprises attaching an enol to the reactive sites.
7. The process of any of the preceding or following clauses, wherein step ii. comprises attaching cis-9-octadecen-1-ol to the reactive sites.
8. The process of any of the preceding or following clauses, wherein step b. comprises adding the precursor activated carbon product to a solution of at least the first vinyl monomer, to yield a polymerization ready mixture.
9. The process of any of the preceding or following clauses, wherein step c. comprises exposing the polymerization ready mixture to ultraviolet light.
10. The process of any of the preceding or following clauses, wherein step c. comprises heating the polymerization ready mixture.
11. The process of any of the preceding or following clauses, wherein the first vinyl monomer comprises ethylene, propylene, vinyl chloride, vinyl acetate, styrene, vinyl alcohol, methyl methacrylate, acrylamide, or diallyldimethylammonium chloride.
12. The process of any of the preceding or following clauses, wherein step b. comprises exposing the precursor activated carbon product to the first vinyl monomer and at least a second vinyl monomer, and step c. comprises initiating the polymerization reaction to graft the first vinyl monomer to the grafting sites and co-polymerize the first vinyl monomer and the second vinyl monomer, wherein the polymer comprises a co-polymer of the first vinyl monomer and the second vinyl monomer.
13. The process of any of the preceding or following clauses, wherein step b. comprises exposing the precursor activated carbon product to the first vinyl monomer and at least a second vinyl monomer; and step c. comprises initiating the polymerization reaction to graft the first vinyl monomer to a first subset of the grafting sites and polymerize the first vinyl monomer and to graft the second vinyl monomer to a second subset of the grafting sites and polymerize the second vinyl monomer.
14. The process of any of the preceding or following clauses, wherein the second vinyl monomer comprises ethylene, propylene, vinyl chloride, vinyl acetate, styrene, vinyl alcohol, methyl methacrylate, acrylamide, or diallyldimethylammonium chloride.
15. A functionalized activated carbon product made by the process of any of the preceding or following clauses.
16. A method for producing a functionalized activated carbon product, comprising: a. creating grafting sites on a surface of an activated carbon product to yield a precursor activated carbon product, by functionalizing the surface of the activated carbon product with bromine to create reactive sites and then attaching an enol to the reactive sites to provide the grafting sites; b. exposing the precursor activated carbon product to at least a first vinyl monomer; and c. initiating a polymerization reaction to graft the first vinyl monomer to the grafting sites and polymerize the first vinyl monomer, to yield the functionalized activated carbon product, wherein the functionalized activated carbon product comprises the activated carbon product grafted with a polymer of at least the first vinyl monomer.
17. A functionalized activated carbon product, comprising: an activated carbon product having a surface; and at least a first polymer grafted to the surface in a brush configuration.
18. The functionalized activated carbon product of any of the preceding or following clauses, wherein the first polymer comprises a polymer of a first vinyl monomer.
19. The functionalized activated carbon product of any of the preceding or following clauses, further comprising at least a second polymer grafted to the surface.
20. The functionalized activated carbon product of any of the preceding or following clauses, wherein the first polymer comprises a co-polymer of a first vinyl monomer and a second vinyl monomer.
21. The functionalized activated carbon product of any of the preceding or following clauses, wherein the first polymer comprises polyacrylamide.
22. The functionalized activated carbon product of any of the preceding or following clauses, wherein the first polymer comprises polydiallyldimethylammonium chloride.
23. The functionalized activated carbon product of any of the preceding or following clauses, wherein the first polymer has an average molecular weight of between about 40 kDa and about 2000 kDa.
24. The functionalized activated carbon product of any of the preceding or following clauses, wherein the first polymer has an average molecular weight of about 100 kDa.
25. The functionalized activated carbon product of any of the preceding or following clauses, wherein the first polymer has an average molecular weight of about 120 kDa.
26. The functionalized activated carbon product of any of the preceding or following clauses, wherein the first polymer has an average molecular weight of about 250 kDa.
27. The functionalized activated carbon product of any of the preceding or following clauses, wherein the first polymer has an average molecular weight of about 500 kDa.
28. A use of the functionalized activated carbon product of any of the preceding or following clauses in water cleaning.
29. A use of the functionalized activated carbon product of any of the preceding or following clauses to remove chloride ions from water
30. A process for removing contaminants from water, comprising: a. adding a functionalized activated carbon product to contaminated water, wherein the functionalized activated carbon product comprises an activated carbon product having a surface and at least a first polymer grafted to the surface; and b. allowing the functionalized activated carbon product to adsorb contaminants from the contaminated water.

31. The process of any of the preceding or following clauses, wherein the first polymer is grafted to the surface in a brush configuration.
32. The process of any of the preceding or following clauses, wherein step b. comprises allowing the activated carbon product of the functionalized activated carbon product to adsorb contaminants from the contaminated water and/or allowing the first polymer to adsorb contaminants from the contaminated water.
33. The process of any of the preceding or following clauses, wherein step b. further comprises allowing the first polymer to flocculate contaminants in the contaminated water.
34. The process of any of the preceding or following clauses, wherein step b. further comprises allowing the first polymer to facilitate settling of contaminants in the contaminated water.
35. The precursor activated carbon product of any of the preceding or following clauses.
36. A system for recovering contaminants from water; comprising: a pipeline to carry a supply of contaminated water; a supply of a functionalized activated carbon product, to be in communication with an upstream site in the pipeline, under conditions to enable the process of any of the preceding or following clauses.
37. A process for producing a precursor activated carbon product, comprising: creating grafting sites on a surface of an activated carbon product, to yield the precursor activated carbon product, by creating reactive sites on the surface of the activated carbon product and attaching an organic molecule to the reactive sites to provide the grafting sites.

We claim:

1. A process for producing a functionalized activated carbon product, comprising:
   a. creating grafting sites on a surface of an activated carbon product to yield a precursor activated carbon product by i. creating reactive sites on the surface of the activated carbon product, and ii. attaching cis-9-octadecen-1-ol to the reactive sites to provide the grafting sites;
   b. exposing the precursor activated carbon product to at least a first vinyl monomer; and
   c. initiating a polymerization reaction to graft at least the first vinyl monomer to the grafting sites and to polymerize at least the first vinyl monomer, to yield the functionalized activated carbon product, wherein the functionalized activated carbon product comprises the activated carbon product grafted with a polymer of at least the first vinyl monomer.

2. The process of claim 1, wherein the polymer is grafted to the activated carbon product in a brush configuration.
3. The process of claim 1, wherein step i. comprises functionalizing the surface of the activated carbon product with a halogen.
4. The process of claim 3, wherein step i. comprises functionalizing the surface of the activated carbon product with bromine.
5. The process of claim 1, wherein step b. comprises adding the precursor activated carbon product to a solution of at least the first vinyl monomer, to yield a polymerization ready mixture.
6. The process of claim 5, wherein step c. comprises exposing the polymerization ready mixture to ultraviolet light.
7. The process of claim 5, wherein step c. comprises heating the polymerization ready mixture.
8. The process of claim 1, wherein the first vinyl monomer comprises ethylene, propylene, vinyl chloride, vinyl acetate, styrene, vinyl alcohol, methyl methacrylate, acrylamide, or diallyldimethylammonium chloride.
9. The process of claim 1, wherein
   step b. comprises exposing the precursor activated carbon product to the first vinyl monomer and at least a second vinyl monomer, and
   step c. comprises initiating the polymerization reaction to graft the first vinyl monomer to the grafting sites and co-polymerize the first vinyl monomer and the second vinyl monomer,
   wherein the polymer comprises a co-polymer of the first vinyl monomer and the second vinyl monomer.
10. The process of claim 1, wherein
    step b. comprises exposing the precursor activated carbon product to the first vinyl monomer and at least a second vinyl monomer; and
    step c. comprises initiating the polymerization reaction to graft the first vinyl monomer to a first subset of the grafting sites and polymerize the first vinyl monomer, and to graft the second vinyl monomer to a second subset of the grafting sites and polymerize the second vinyl monomer.
11. The process of claim 1, wherein the second vinyl monomer comprises ethylene, propylene, vinyl chloride, vinyl acetate, styrene, vinyl alcohol, methyl methacrylate, acrylamide, or diallyldimethylammonium chloride.
12. A functionalized activated carbon product made by the process of claim 1.
13. The precursor activated carbon product of claim 1.

* * * * *